United States Patent [19]

Eugene et al.

[11] Patent Number: 5,348,044
[45] Date of Patent: Sep. 20, 1994

[54] SEALED DRAINAGE UNIT FOR A HYDRAULIC CIRCUIT

[75] Inventors: Michel Eugene, Colomiers; Jean-Claude Rodriguez, Toulouse; René Debons, Aussonne. all of France

[73] Assignee: Aerospatiale Societe Nationale Industrielle, Paris, France

[21] Appl. No.: 32,506

[22] Filed: Mar. 17, 1993

[30] Foreign Application Priority Data

Mar. 20, 1992 [FR] France .................. 92 03383

[51] Int. Cl.$^5$ ........................................ F16L 55/168
[52] U.S. Cl. ........................ 137/312; 73/46; 73/49.1; 137/375; 138/149; 285/55
[58] Field of Search ............ 137/312, 375; 138/149; 73/40.5 R, 46, 49.1, 49.3, 49.5, 49.8; 285/45, 55

[56] References Cited

U.S. PATENT DOCUMENTS

| | | | |
|---|---|---|---|
| 2,954,797 | 10/1960 | Dryer | 137/312 |
| 3,802,456 | 4/1974 | Wittgenstein | 137/312 |
| 4,259,981 | 4/1981 | Busse | 137/375 |
| 4,341,235 | 7/1982 | Nord | 137/312 |
| 4,577,655 | 3/1986 | Carroll | 137/375 |
| 4,696,324 | 9/1987 | Petronko | 137/375 |
| 4,830,060 | 5/1989 | Botsolas | 137/375 |

FOREIGN PATENT DOCUMENTS

| | | |
|---|---|---|
| 9102395 | 7/1991 | Fed. Rep. of Germany . |
| 2509422 | 1/1983 | France . |
| 418072 | 2/1967 | Switzerland . |
| 8303458 | 10/1983 | World Int. Prop. O. . |
| 9115705 | 10/1991 | World Int. Prop. O. . |

Primary Examiner—George L. Walton
Attorney, Agent, or Firm—Michael N. Meller

[57] ABSTRACT

A drainage circuit surrounding a hydraulic circuit, such as a circuit for distributing drinking water on an aircraft, includes an element around one enlarged portion (right connector, T, Y connector, etc) of the hydraulic circuit, namely a draining unit (20) formed of two half shells (24, 26) and tubular joining pieces (28). Imperviousness between the two half shells and between the half shells and the joining pieces is ensured by projecting portions (36, 38) which penetrate into a humidity-repellent stabilized gel (40) placed inside receptacles (42, 44). In addition, clipping members (48, 50) are provided on the half shells.

6 Claims, 4 Drawing Sheets ns depends on the continuity and thickness of the glue cord and tends to decrease if there is a leak from the connector, having regard to the pressure existing in the water circuit.

The preceding description reveals that the drainage units, currently used in drainage circuits associated with the hydraulic circuits calling for protection from leaks, are not always completely impervious, this imperviousness being difficult to obtain and whose effectiveness tends to diminish by virtue of the pressure existing in the hydraulic circuit when a leak occurs in said circuit.

SEALED DRAINAGE UNIT FOR A HYDRAULIC CIRCUIT

FIELD OF THE INVENTION

The invention concerns a drainage unit provided to be placed on one enlarged portion, such as a righthand, T or Y-shaped connector, of a hydraulic circuit so as to be fully sealed.

BACKGROUND OF THE INVENTION

This type of drainage unit may be used whenever the appearance of a leak in a hydraulic circuit may lead to unacceptable consequences for the environment. In particular, this situation may occur when the hydraulic fluid circulating in the circuit is a danger itself or dangerous owing to chemical or explosive reactions causing said fluid to escape outside the circuit. This situation may also occur if the hydraulic circuit is situated immediately close to an electric or electronic installation.

This latter situation applies in particular to the drinking water distribution circuit on aircraft. In fact, any possible leaking from this circuit must in no instance result in a flowing of water towards the electronic and electric systems located close to certain sensitive zones of the circuit.

So as to eliminate this risk, it is normal to add to the aircraft drinking water circuit, certainly at least in these sensitive zones close to the electronic and electric systems, drainage circuits disposed around the water distribution pipes. These drainage circuits allow a possible water leak to be drained towards external drains situated in those zones far away from the aircraft electronic and electric systems.

In practice, the drainage circuits are constituted by pipes situated disposed concentrically around the water distribution pipes and by drainage units placed on the enlarged portions of the water circuit and constituted by the righthand, T or Y connectors of this circuit.

When the enlarged portion of the water circuit corresponds to a righthand connector, the drainage unit normally includes a large diameter sheath surrounding the connector and having its extremities being glued onto metallic joining pieces mounted on the water distribution pipes close to the connector, and also supporting the adjacent extremities of the drainage pipes. In this case, imperviousness of the drainage circuit is therefore ensured by glueing the sheath to the joining pieces. As a result, the quality of imperviousness mainly depends on whether or not glueing has been effected carefully. Furthermore, if a leak occurs in the connector, the pressure generally existing in the water circuit favors separation of the sheath and the appearance of a leak in the drainage circuit.

When the widened portion of the water circuit corresponds to a T or Y-shaped connector, the drainage unit normally includes two identical half-shells having opposing flat faces by which said half-shells are glued to each another. These half-shells are also glued onto metallic joining pieces placed as previously on the extremities of the water distribution pipes adjacent to the connector and also used to support the extremities of the drainage pipes. The holding of these half-shells in position is ensured by three metallic rings placed around said metallic joining pieces. Given the fact that the surface evenness of the surfaces opposite the half-shells is rarely satisfactory, imperviousness of these drainage units is difficult to obtain. Moreover, this impervious-

SUMMARY OF THE INVENTION

The invention concerns a new type of drainage unit, easy to use and procuring improved imperviousness with respect to existing drainage units and allowing for an almost unlimited number of easy fast dismountings and remountings.

In accordance with the invention, this result is obtained with the aid of a drainage unit provided to be placed on one widened portion of a hydraulic circuit and connecting at least two pipes of this circuit, said drainage unit including a drainage joining piece suitable for being mounted on each pipe close to the widened portion, at least two complementary half-shells, means for closing the half-shells, and imperviousness means inserted between the half-shells and between the joining pieces and the half-shells, and wherein the imperviousness means include receptacles open towards the outside and containing a humidity-repellent stabilized gel and projecting portions able to become incrusted in the stabilized gel.

Imperviousness in the drainage member embodied in this way is obtained via the penetration of the projecting portions into the stabilized gel. Flow of the gel which then occurs, as well as the humidity-repellent nature of this gel, guarantee obtaining good imperviousness by simply assembling the half-shells. The mounting and dismounting of the drainage unit are considerably simplified and the time for mounting this unit is significantly reduced. Moreover, the stabilized gel does not adhere to the projecting portions which become incrusted in this gel. The various elements constituting the drainage unit may thus be reused after this unit has been dismounted.

In one preferred embodiment of the invention, the imperviousness means between the half-shells include first receptacles formed on one first half-shell and containing a stabilized gel defining an approximately flat joining surface and in which the first projecting portions formed on a second half-shell are able to become incrusted.

In this case, the imperviousness means between the joining pieces and the half-shells include second receptacles formed on the half-shells, said means containing a stabilized gel defining an approximately semi-cylindrical joining surface and in which the second projecting annular-shaped portions formed on the drainage joining pieces are able to become incrusted.

The various projecting portions which penetrate into the stabilized gel may have a section with the shape of an arc of a circle.

So as to facilitate their placing, the half-shells may advantageously be interconnected by linking means constituted, for example, by flexible tongues authorizing the opening and closing of the drainage unit.

Finally, so as to facilitate the mounting and dismounting of the drainage unit and improve its resistance to pressure, the means for closing the half-shells advantageously comprise latching means ensuring that said half-shells are kept in a relative closed position.

BRIEF DESCRIPTION OF THE DRAWINGS

There now follows a non-restrictive example of a description of two embodiments of the invention with reference to the accompanying drawings on which.

DETAINED DESCRIPTION OF THE PREFERRED EMBODIMENTS

Figure 1:
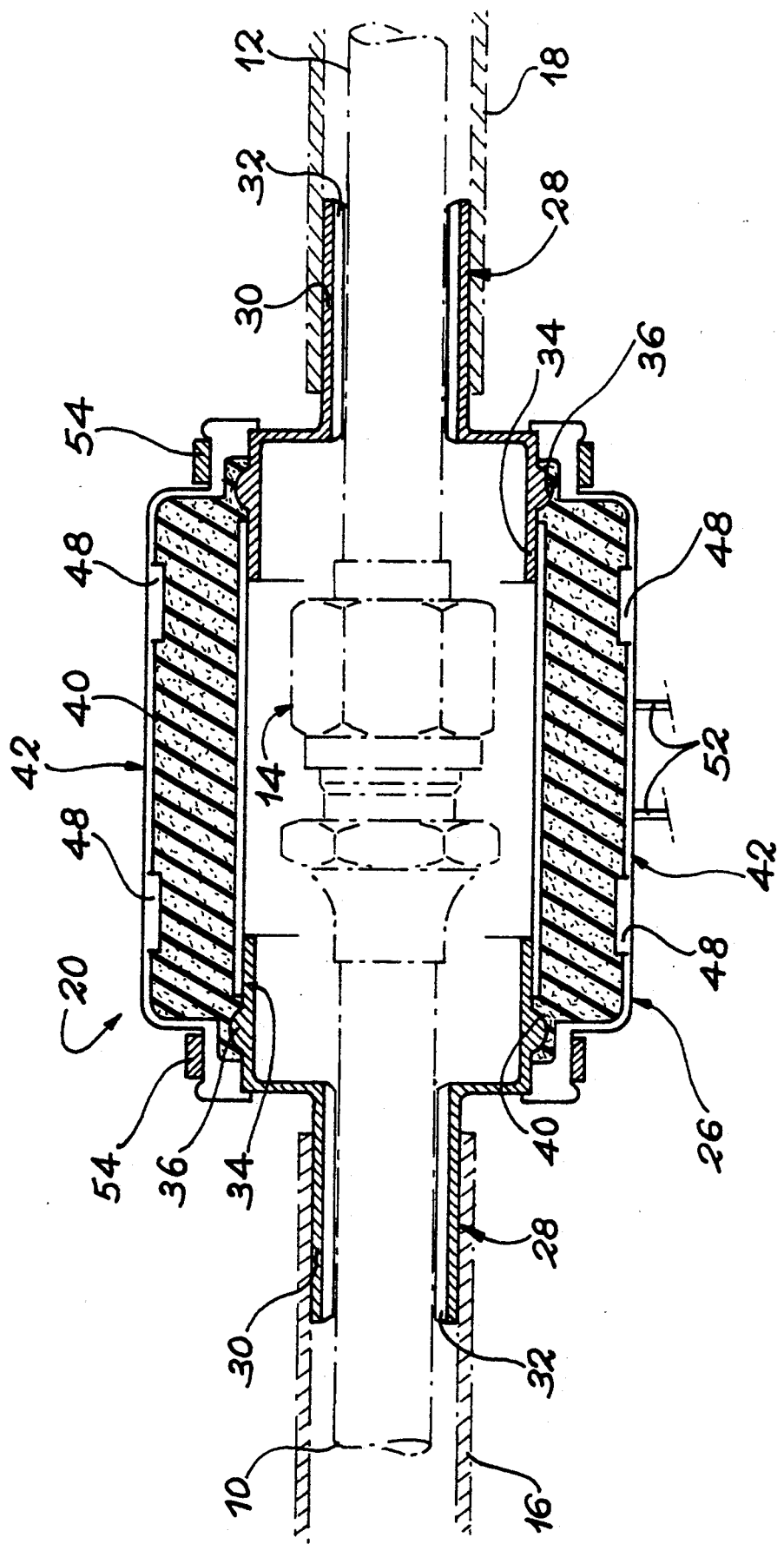
FIG. 1 is a longitudinal cutaway view of a drainage unit according to the invention and provided to be placed on a righthand connector of a hydraulic circuit.

On FIG. 1, the references 10 and 12 denote the adjacent aligned extremities of two pipes normally connected in a sealed way by a connector 14. The pipes 10 and 12 and the connector 14 belong to a hydraulic circuit, such as the under pressure drinking water distribution circuit of an aircraft. The portion of this circuit shown on FIG. 1 is assumed to be situated in a sensitive zone of the aircraft, that is close to the electric and/or electronic systems where any appearance of humidity is unacceptable for safety reasons.

So as to meet safety standards, the portion of the circuit shown on FIG. 1 is externally doubled by a drainage circuit. Around the pipes 10 and 12, this drainage circuit includes pipes 16 and 18 placed concentrically so as to provide between the water distribution pipes and the drainage pipes an annular drainage space to be connected to external drains (not shown).

Given the fact that the diameter of the pipes 16 and 18 is insufficient to be able to house the connector 14, the drainage circuit includes at its right portion a drainage unit 20 encompassing in a sealed way the connector 14 and seal-connected to the adjacent extremities of the pipes 16 and 18.

Figure 2:
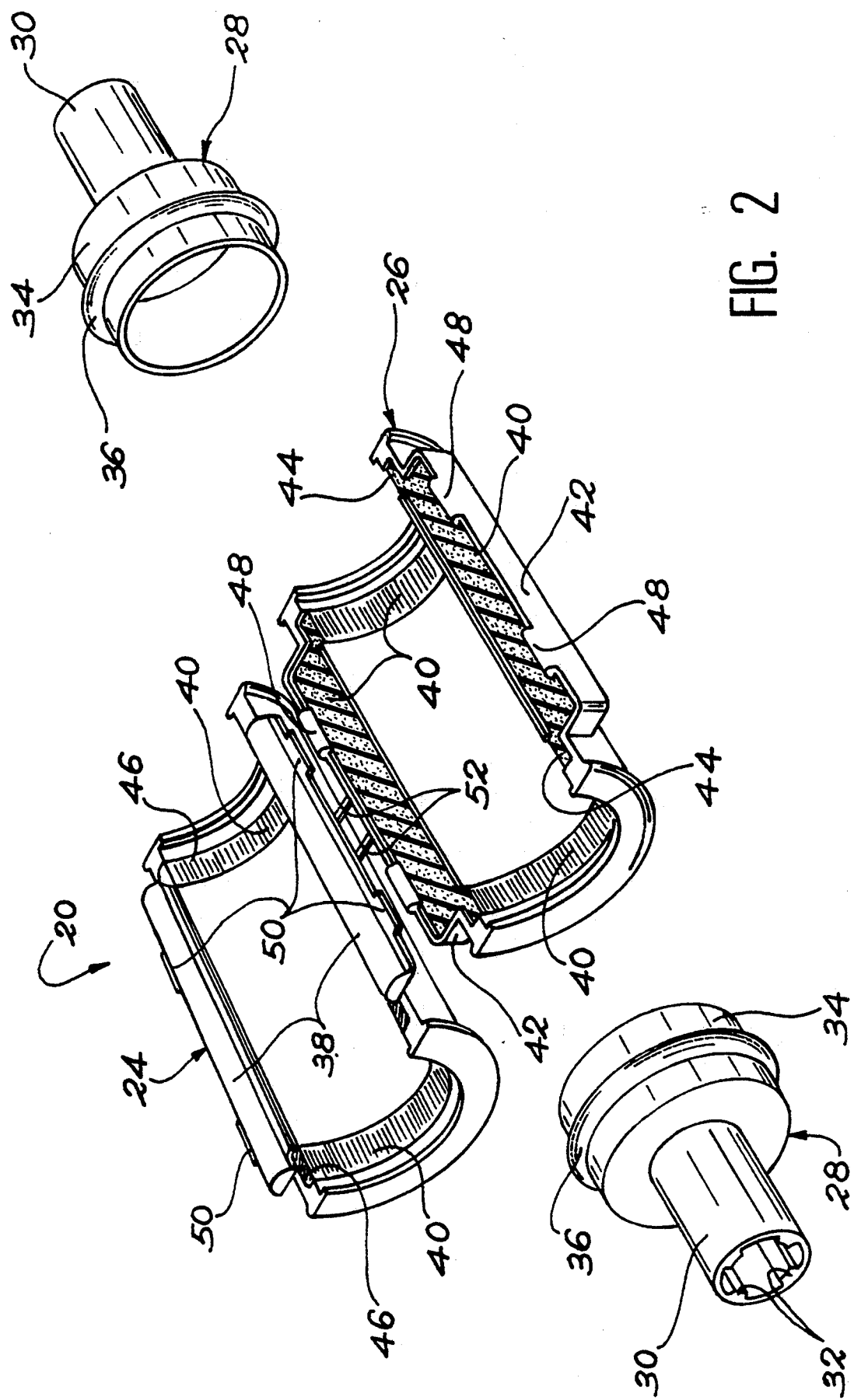
FIG. 2 is a perspective exploded view showing the constitutive elements of the drainage unit of FIG. 1 in an open position.

As shown in more detail on FIG. 2, this drainage unit 20 includes two half-shells 24 and 26 and two identical joining pieces 28.

Each of the tubular joining pieces 28 includes one portion 30 with a relatively small diameter and provided to be stored on the corresponding pipe 10 or 12 and receive on its external surface the extremity of the corresponding pipe 16 or 18. More specifically, the internal surface of the portion 30 of each of the tubular joining pieces 28 is provided with grooves 32 allowing for the fixing, by glueing for example, of the joining piece to the extremity of the corresponding pipe 10 or 12, whilst providing passages for the hydraulic fluid subsequently collected in the drainage circuit. The external surface of the portion 30 of each of the tubular joining pieces 28 has on the other hand a smooth aspect and its diameter corresponds to the internal diameter of the pipes 16 and 18 so that the securing of the latter to the joining pieces may be effected by glueing.

Each of the tubular joining pieces 28 also comprises a portion 34 with a relatively large diameter and provided to be orienteded towards the connector 14 and with which the extremities of the half-shells 24 and 26 are able to cooperate in a sealed way, as shall be seen subsequently. To this effect, the portion 34 of each of the tubular joining pieces 28 comprises on its external surface a projecting portion constituted by an annular flange 36 which comprises a section with the shape of an arc of a circle.

The joining pieces 28 may be made of any rigid material, such as a metallic alloy or a plastic material.

As shown on FIG. 1, each of the half-shells 24 and 26 roughly has the shape of a half-tube cut along a mold joint passing through its axis. More specifically, each of the two edges of the half-shell 24 situated inside this mold joint comprises a projection portion forming a rectilinear flange 38 which extends parallel to the axis of the half-shell and has an arc of a circle-shaped section.

Each of the two flanges 38 is provided to become incrusted in a humidity-repellent stabilized gel 40 contained in two receptacles 42 open towards the outside and formed in the half-shell 26 along the mold joint of this half-shell. More specifically, the stabilized gel 40 received in each of the receptacles 42 has a free surface which defines an approximately flat joining surface and in which the corresponding flange 38 of the other half-shell is able to become incrusted when the two half-shells are assembled along their mold joint.

The humidity-repellent stabilized gel 40 is a silicon-based gel, for example. In particular, it may be a Geltek gel commercialized by the Raychem company.

Moreover, the internal surface of each of the half-shells 24 and 26 has close to its extremities semi-annular throats 44 and 46, also forming receptacles open outwardly, and in which the stabilized gel 40, identical to the one placed in the receptacles 42, is placed. The gel 40 received in the throats 44 and 46 defines roughly semi-cylindrical joining surfaces. When the half-shells 24 and 26 are assembled and placed on the tubular joining pieces 28, the relative axial positioning of these pieces is such that the flanges 36 of the tubular joining pieces 28 become incrusted in the stabilized gel 40 placed in the semi-circular throats 44.

So as to ensure continuity of imperviousness, the throats 46 formed in the half-shell 26 open into the extremities of the receptacles 42 of the latter, as shown on FIGS. 1 and 2.

The disposition described immediately above allows for an extremely simple imperviousness of the drainage unit 20 under the combined effect of the flow of the gel mass 40 obtained during incrustation of the flanges 36 and 38 in the gel, and the humidity-repellent nature of the gel used.

Furthermore, each of the half-shells 24 and 26 advantageously has complementary latching means able to guarantee good behaviour of the drainage unit when it is subjected to an internal pressure if there is a leak in the hydraulic circuit. In the embodiment shown, these latching means include notched projections 48 formed on the outer edges of the receptacles 42 of the half-shell 26 and tongues 50 formed on the outer edges of the flanges 38 of the half-shell 24. The notched projections and the tongues 50 have complementary forms favoring one of the two half-shells being held against the other against any possible internal pressure.

So as to complete the description of the drainage unit 20 shown on FIGS. 1 and 2, the two half-shells 24 and 26 are advantageously interconnected by two flexible hinges 52 shown on FIGS. 1 and 2. This characteristic facilitates the placing of the drainage unit by guaranteeing a good relative axial positioning of the two half-shells.

In the embodiment just described, the half-shells 24 and 26 connected by the flexible hinges 52 are advantageously made of a semi-rigid plastic material. The two half-shells may also be made of a metallic alloy, the flexible hinges 52 then being replaced if necessary by a hinge pin.

As shown on FIG. 1, the drainage unit of the invention also comprises two conventional follars 54 provided to be placed around the extremity portions of the half-shells 24 and 26 when the latter are reclosed. The collars 54 are then located roughly at the right of the throats 44 and 46 containing the stabilized gel 40.

Figure 3:
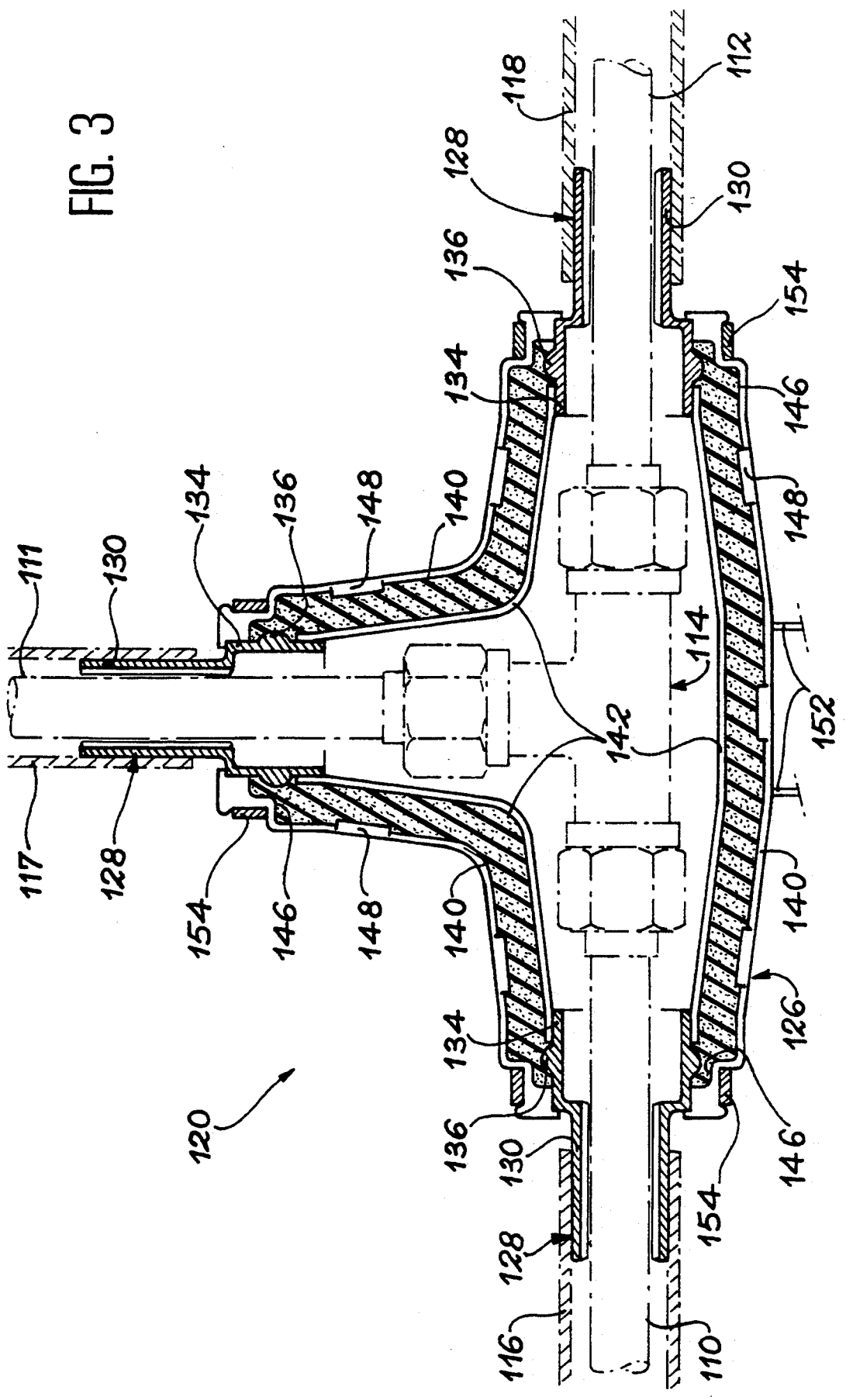
FIG. 3 is a cutaway view of a drainage unit according to the invention and provided to be placed on a T connector of a hydraulic circuit.
Figure 4:
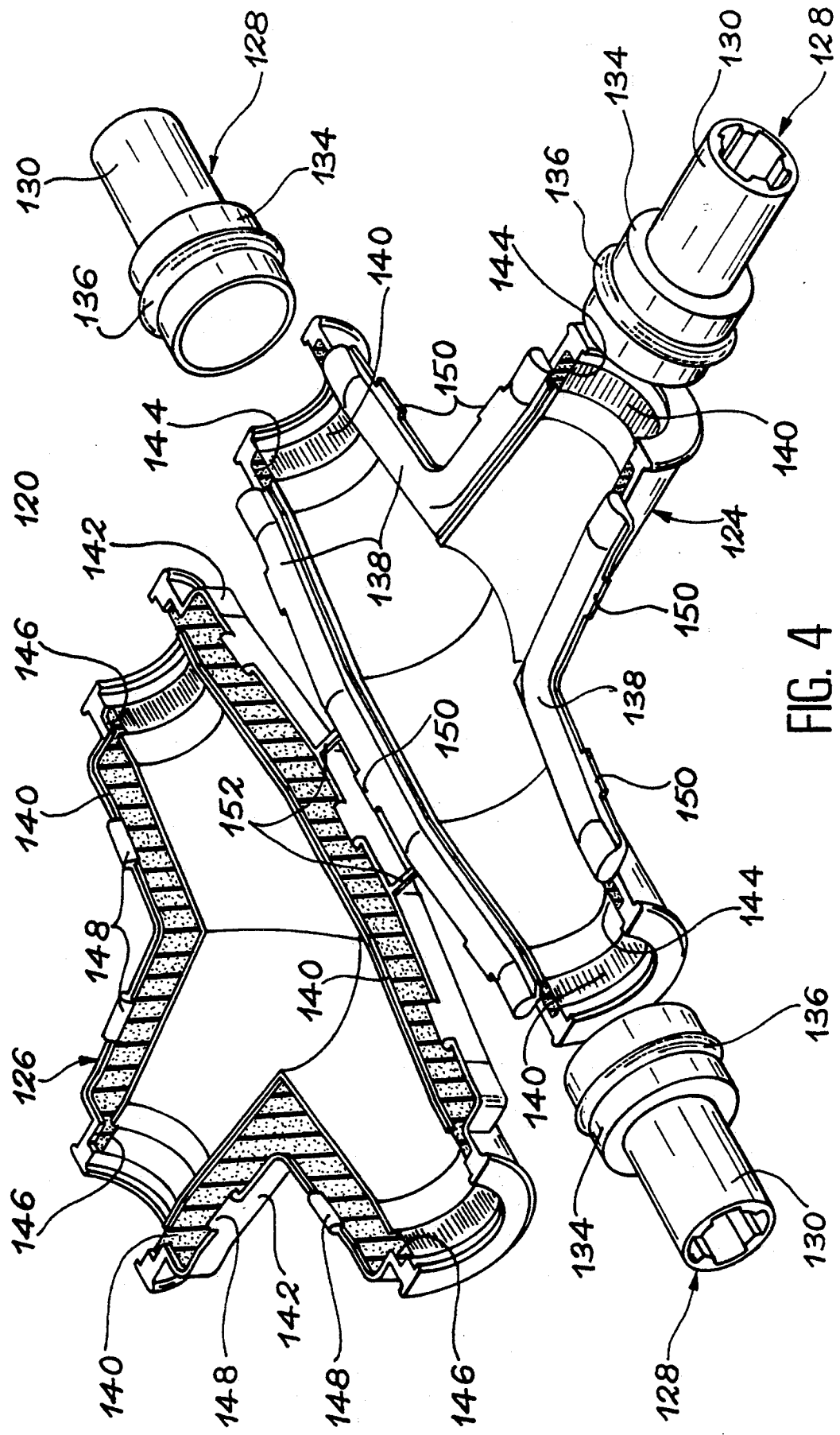
FIG. 4 is an exploded perspective view showing the constitutive elements of the drainage unit shown on FIG. 3 in an open position.

The drainage unit 20 described above with reference to FIGS. 1 and 2 is provided to be placed around a rectilinear connector 14 situated between two aligned pipes 10 and 12 of a hydraulic circuit. FIGS. 3 and 4 show a drainage unit 120 provided to be placed around a T connector 114 placed between the adjacent extremities of three pipes 110, 111 and 112 of a hydraulic circuit.

The drainage unit 120 used in this case has the same essential characteristics as the drainage unit 20 of FIGS. 1 and 2, especially as regards the obtaining of imperviousness and holding of the drainage unit in its assembled position. It is to be noted that the following description also applies to the case of a drainage unit provided to be placed on a Y connector.

As in the preceding embodiment with reference to FIGS. 1 and 2, the drainage unit 120 shown on FIGS. 3 and 4 includes two half-shells 124 and 126 and are preferably interconnected by two flexible hinges 152, as well as three tubular joining pieces 128 similar to the joining pieces 28 of the first embodiment. These three joining pieces 128 are provided to be placed on the extremities of the pipes 110, 111 and 112 and receive on their portions 130 with a relatively small diameter the extremities of the pipes 116, 117 and 118 (FIG. 3) which complete the drainage circuit around the pipes 110, 111 and 112. Each of the large diameter portions 134 of the tubular joining pieces 128 is then orientated towards the T connector 114 and has on its outer surface an annular flange 136 having an arc of a circle-shaped section. When the half-shells 124 and 126 are assembled, these flanges 136 penetrate into semicircular throats 144 and 146 formed inside the half-shells 124 and 126 so as to become incrusted in the roughly semicylindrical joining surface of a humidity-repellent stabilized gel 140 contained in the throats 144 and 146. This gel 140 has the same characteristics as the gel 40 in the first embodiment.

Imperviousness between the half-shells 124 and 126 is ensured similarly by means of flanges 138 with an arc of a circle-shaped section formed on the edges of the half-shell 124 and by means of receptacles 142 open outwardly and filled with the same stabilized gel 140 and formed on the opposing edges of the half-shell 126. More specifically, the half-shells 124 and 126 have a mold joint roughly merged with their plane of symmetry and the flanges 138 and the receptacles 142 are formed on the edges of the half-shells 124 and 126 contained in this mold joint.

When the two half-shells 124 and 126 are assembled, the flanges 138 become incrusted in the stabilized gel 140 contained in the receptacles 142 so that good imperviousness between the half-shells is ensured via flowing of the gel around the flanges 138. At the same time, the flanges 136 of the tubular joining pieces 128 penetrate into the gel 140 contained in the semicircular throats 146 so that a given quality of imperviousness is obtained between the joining pieces and the half-shells.

So as to ensure continuity of imperviousness, the receptacles 142 communicate with the semicircular throats 146, as shown on FIGS. 3 and 4.

As in the case of the drainage unit 20 shown on FIGS. 1 and 2, the drainage unit 120 shown on FIGS. 3 and 4 is advantageously equipped with latching means including, for example, notched projections 148 which project beyond the mold joint onto the outer edges of the receptacles 142 of the half-shell 126 so as to cooperate with the tongues 150 formed on the outer edges of the flanges 138 of the half-shell 124 when the latter is folded back onto the half-shell 126. The quality of imperviousness is thus preserved when the inside of the drainage unit is pressurized.

So as to complete the assembling of the half-shells 124 and 126, collars 154 (FIG. 3) are placed on the extremities of these half-shells surrounding the tubular joining pieces 128 after the half-shells have been latched onto each other.

As previously, the materials constituting the tubular joining pieces 128 and the half-shells 124 and 126 may, depending on the case, be metallic alloys or plastic materials.

In the light of the preceding description, it can be easily understood that the forms and dimensions of the half-shells, as well as the dimensions of the joining pieces, are selected according to the shapes and spatial requirement of the connectors and pipes of the hydraulic circuit on which the drainage unit is placed.

Furthermore, drainage units conforming to the invention may be used on any enlarged portion of a hydraulic circuit, even when this enlarged portion is not constituted by a connector. In addition, in certain more complex configurations of the hydraulic circuit, the drainage unit may include more than two half-shells.

What is claimed is:

1. Drainage unit adapted to be placed on an enlarged portion of a hydraulic circuit and connecting at least two pipes of this circuit, said drainage unit including a drainage joining piece able to be mounted on each pipe close to the enlarged portion, at least two complementary half-shells, means for closing the half-shells, and imperviousness means inserted between the half-shells and between the joining pieces and the half-shells, wherein the imperviousness means include receptacles containing a humidity-repellent stabilized gel impervious to hydraulic fluid, and projecting portions arranged on said drainage joining pieces and at least one of said half-shells and able to become incrusted inside the stabilized gel by cooperating with said receptacles when said half-shells are closed to prevent any fluid from said hydraulic circuit escaping outside of said drainage unit.

2. Drainage unit according to claim 1, wherein the imperviousness means between the half-shells include first receptacles formed on one first half-shell containing the stabilized gel defining an approximately flat joining surface and wherein the first projecting portions formed on a second half-shell are able to become incrusted.

3. Drainage unit according to claim 1, wherein the imperviousness means between the joining pieces and the half-shells include second receptacles formed on the half-shells containing the stabilized gel defining an approximately semicylindrical joining surface, and wherein said projecting portions formed on the drainage joining pieces are annular shaped and are able to become incrusted.

4. Drainage unit according to claim 1, wherein each projecting portion has the shape of an arc of a circle.

5. Drainage unit according to claim 1, wherein the half-shells are interconnected by linking means enabling the opening and closing of the drainage unit.

6. Drainage unit according to claim 1, wherein the means for closing the half-shells comprise latching means ensuring their relative keeping in a closed position.

* * * * *